United States Patent

Covert

[11] 3,706,469
[45] Dec. 19, 1972

[54] FRAME MOUNTED CAMPER HOLD-DOWN

[72] Inventor: Frederick M. Covert, 9115 Jackson Road, Dexter, Mich.

[22] Filed: July 21, 1971

[21] Appl. No.: 164,646

[52] U.S. Cl. .......................... 296/23 MC, 248/361
[51] Int. Cl. ............................................ B60p 3/32
[58] Field of Search ....... 296/23 MC, 35 A; 214/512, 515; 248/361

[56] References Cited

UNITED STATES PATENTS 3,655,234   4/1972   Kirschbaum ............... 296/23 MC

Primary Examiner—Philip Goodman
Attorney—Townsend F. Beaman et al.

[57] ABSTRACT

A hold-down device for maintaining recreational vehicle campers upon the bed of a pickup truck wherein the hold-down is mounted directly and solely to the main vehicle frame.

The apparatus of the invention includes an elongated arm having an inner end bolted to the truck frame, and outer end attached by means of flexible tension means to the camper enclosure. Bracing means is interposed between the ends of the arm and the vehicle frame to resist upward deflection of the arm and the hold-down apparatus may be readily bolted upon pickup truck frames, and removed therefrom.

8 Claims, 8 Drawing Figures

PATENTED DEC 19 1972　　　　　　　　　　　　　　3,706,469

INVENTOR
FREDERICK M. COVERT
BY Beaman & Beaman
ATTORNEYS

FRAME MOUNTED CAMPER HOLD-DOWN

BACKGROUND OF THE INVENTION

The invention pertains to hold-down devices for use with pickup truck vehicles wherein it is desired to maintain a recreational vehicle enclosure securely upon the truck bed.

The pickup truck camper is a popular recreational vehicle in that self-propelled facilities may be obtained at a relatively economical cost. In a pickup recreational vehicle camper a camper enclosure is supported upon a conventional pickup truck bed, and attachment means are commonly employed between the bed and the enclosure to prevent the camper enclosure or housing from shifting relative to the bed.

In prior arrangements for maintaining the camper enclosure upon the vehicle bed, attachment or hold-down structure is interposed between the bed and the camper enclosure as typified in U.S. Pat. Nos. 3,454,253; 3,475,049; 3,486,785 and 3,489,454. Such truck bed mounted hold-down devices do not provide the degree of stability necessary to permit safe turning of the vehicle, and due to the rather "top heavy" characteristics of the vehicle resulting from the mounting of the camper thereon, swaying and other undesirable driving characteristics occur. The bed mounted hold-down is not suitable for producing a stable anchoring of the camper in that the truck bed itself is resiliently mounted to the truck frame by means of rubber cushions and the like, and thus, resilient elements will permit a swaying of the bed, and camper enclosure as a unit.

In order to overcome the problems attendant with bed mounted camper hold-down devices it has been proposed to at least partially utilize the vehicle frame, as disclosed in U.S. Pat. No. 3,368,785. However, the device shown in this patent, and devices of which the inventor is aware, wherein the vehicle frame is employed, do not permit the high degree of stability desired in that the vehicle bed is still utilized for orientation and support purposes. It is known to weld brackets to the vehicle body frame for holding the camper enclosure upon the vehicle bed, but such welded brackets are expensive, require special skills, and require an objectionable permanent modification to the pickup truck in that the truck may be used for purposes other than carrying the camper enclosure, and should the truck be sold without the camper the presence of the welded brackets is highly objectionable.

SUMMARY OF THE INVENTION

It is the purpose of the invention to provide recreational vehicle pickup truck camper hold-down means which are solely mounted upon the vehicle frame to produce maximum stability, yet the hold-down means is removably attached to the vehicle frame requiring no permanent modifications thereto.

Additionally, it is an object of the invention to provide a frame mounted hold-down for pickup truck campers which may be installed by the vehicle owner utilizing only conventional skills, and ordinary tools. Further, it is of advantage that the hold-down apparatus be transferrable from one camper pickup truck to another, if desired, and may be readily installed upon existing vehicles with a minimum of modification thereto.

In the practice of the invention an elongated arm is mounted below the vehicle bed having an inner end bolted to the lower flange of a channel shaped main vehicle frame rail. A bracing element includes an outer end affixed to the arm intermediate the inner and outer ends thereof by cooperation with an arm supported socket, and the inner end of the brace is affixed to the vertical portion of the vehicle frame rail, either by means of a plate having holes formed therein, or by means of a threaded portion defined on the brace which extends through the frame. The outer end of the arm is provided with camper enclosure attaching means, such as a chain and turnbuckle, wherein the desired degree of tension may be maintained in the attaching means to produce an effective anchoring between the camper enclosure and the vehicle bed.

It is one of the features of the invention that the mounting means for the hold-down be such as to employ existing holes in the vehicle frame which have been formed in the frame for cooperation with bolts or rivets utilized to attach the frame cross pieces to the longitudinal frame section.

In the practice of the invention the hold-downs are of such configuration as not to interfere with conventional camper accessories mounted below the vehicle bed, such as bumper extensions, and the like, and the ready installation and removal of the hold-downs from the vehicle frame permit a versatility highly desirable from the user's and camper owner's standpoint.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENTS

Figure 1:
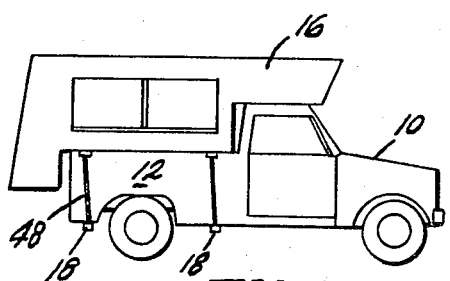
FIG. 1 is a reduced scale, side elevational view of a pickup truck supporting a camper enclosure utilizing hold-down means in accord with the invention.
Figure 4:
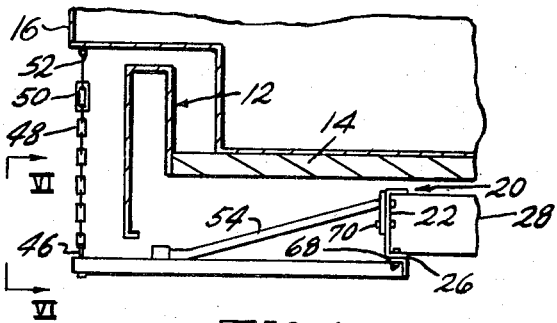
FIG. 4 is an elevational, sectional view illustrating the embodiment of FIG. 2 as installed upon a pickup truck.
Figure 5:
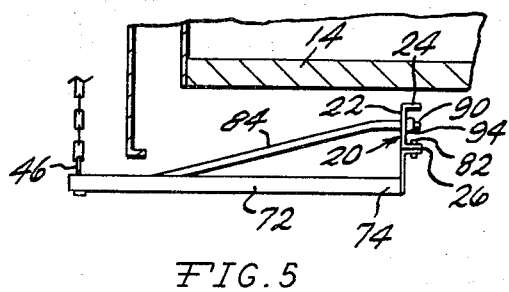
FIG. 5 is an elevational, sectional view similar to FIG. 4 illustrating the installation of the embodiment of FIG. 3.

A typical pickup truck camper recreational vehicle is illustrated in FIG. 1, and includes a pickup truck 10 having a bed section 12 utilizing a bed floor 14, FIGS. 4 and 5. The camper enclosure 16 is of a conventional construction, well known in the art, and occupies the truck bed section, and rests upon the bed floor 14. In order to insure the proper positioning of the camper enclosure upon the truck bed, hold-down means 18 are attached to the camper enclosure and are mounted upon the vehicle frame by the apparatus described below.

In the conventional pickup truck construction the vehicle frame is fabricated from main frame rails 20 which extend in the longitudinal direction of the vehicle, two rails being employed and one being disposed adjacent each side of the vehicle. The rails 20 are of a U OR CHANNEL CONFIGURATION INCLUDING A base portion 22 which is vertically disposed, an upper horizontally disposed leg portion 24 and a lower horizontally disposed leg portion 26. The main frame rails 20 are interconnected at various locations by cross members 28, FIG. 4, interposed between the frame rails, and bolted or riveted thereto.

Figure 7:
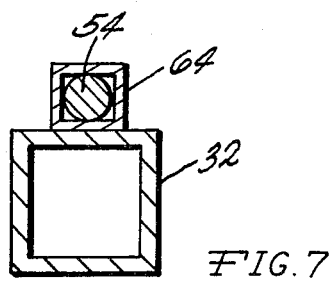
FIG. 7 is an enlarged, sectional view taken through the socket along Section VII—VII of FIG. 2.

A camper hold-down mounted upon the vehicle frame in accord with the practice of the invention is generally indicated at 18, and includes an elongated arm 32 having an inner end 34 and an outer end 36. The arm 32 may be constructed of any conventional structural material, and may be either solid or hollow. In a preferred embodiment the arm is formed of rectangular tubular stock, FIG. 7, which is economically available and provides high strength and resistance to bending with a minimum weight.

The arm inner end 34 is provided with a mounting plate 38, welded thereto, which may be in the form of an angle iron, which includes a downwardly depending leg portion 40. A pair of fastener receiving holes 42 are formed in the plate 38 and the spacing between the holes 42 is such as to conform to holes normally formed in the frame lower portion 26 in conventional pickup truck construction. The outer end 36 of the arm is provided with a hole 44 for receiving a chain anchor 46 to which the chain 48 is attached. The upper end of the chain is provided with a turnbuckle 50, and the turnbuckle terminates at its upper end in an eye type fitting 52 attached to the "overhang" of the camper enclosure 16 as will be appreciated from FIG. 4.

The hold-down 18 also includes bracing means in the form of a brace bar 54, which may consist of a solid cylindrical rod having an inner end 56 and an outer end 58. The inner end 56 is provided with a plate 60 welded thereto, and fastener receiving holes 62 are formed in the plate for receiving bolts or rivets. The vertical spacing between the holes 62 preferably corresponds to the spacing of existing holes in the vehicle frame rail portion 22, and this spacing may be that occurring at the location where a cross member 28 is bolted to the rail. The outer end 58 of the bar is bent to permit the end to be parallel to the arm 32, and a hollow rectangular socket 64 is welded to the upper side of the arm, and includes an open end disposed toward the arm inner end 34. In this manner the outer end of the bar 54 may be inserted into the socket 64. The socket outer end is closed at 66 whereby the extreme end of the rod end 58 may abut the same and its insertion into the socket is thereby limited.

Figure 2:
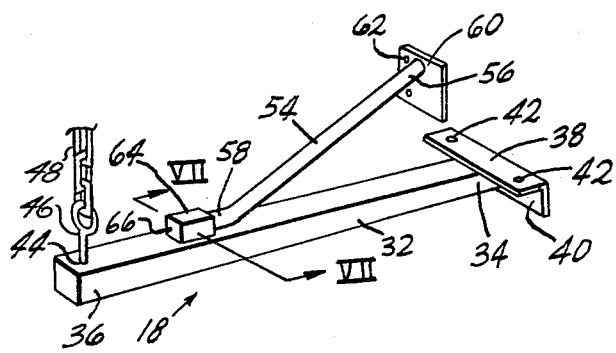
FIG. 2 is a perspective view of one embodiment of hold-down in accord with the invention.
Figure 6:
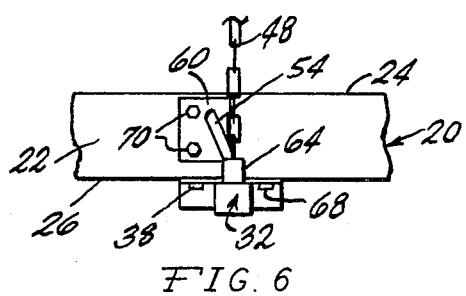
FIG. 6 is a detailed, elevational view as taken along Section VI—VI of FIG. 4.

Installation of the embodiment of FIG. 2 to a pickup truck frame and camper enclosure is illustrated in FIGS. 4 and 6. The hold-down 18 is oriented such that the plate 38 engages the underside of the lower frame horizontal portion 26, and bolts 68 extend through the holes 42, and through aligned holes, not shown, in the frame portion 26 whereby the plate 38 and arm 32 may be rigidly attached to the frame. Also, bolts 70 are inserted through the brace bar plate holes 62, and through holes, not shown, formed in the vertical portion 22 of the frame. The holes in the vertical portion 22 of the frame rails may be drilled, but preferably, such holes are those previously utilized to attach the cross member 28 to the frame rail, and by removing the bolts or rivets originally affixing the frame cross members to the frame rails, the bolts 70 may be used to simultaneously assemble the plate 60 to the frame rail 20, and the frame rail and the vehicle cross frame member 28.

Once the frame hold-down is installed upon the frame rail 20 the turnbuckle eye 52 is attached to the camper enclosure 16, FIG. 4, and by adjusting the turnbuckle 50 the desired degree of tension may be produced in the chain, and hence the desired "hold-down" pressure achieved between the camper enclosure and the truck bed floor 14.

Preferably, four hold-downs 18 are utilized to maintain the camper enclosure upon the truck, and the location of the hold-downs will be apparent from FIG. 1, two hold-downs being used on each side of the truck bed. Preferably, the location of attachment to the camper enclosure at the eye 52 is slightly "behind" the arm outer end 36 such that the biasing force exerted upon the camper enclosure by the hold-downs includes a "forward" vector with respect to the direction of vehicle movement.

As will be appreciated from FIG. 6, the bend in the brace bar 54, in addition to producing a parallel relationship between the rod outer end and the arm 32, is such as to offset the plate 60 with respect to the arm 32. This relationship is desirable in that it permits the holes of the plates 38 and 60 to align with existing holes in the vehicle frame rail. Of course, holes may be drilled in the vehicle frame, if they do not exist, but the utilization of the existing holes simplifies the installation procedure.

Figure 3:
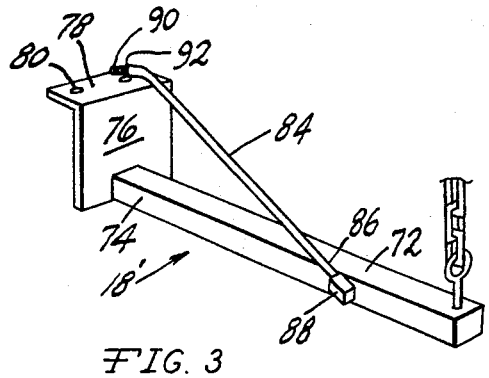
FIG. 3 is a perspective view of another embodiment of hold-down in accord with the invention.

A variation of hold-down apparatus in accord with the invention is shown in FIG. 3. In FIG. 3 the arm 72 is similar to that of arm 32 of the previously described embodiment. The inner end 74 of the arm is provided with an angle element including a vertically disposed portion 76 and a horizontally disposed plate 78 having spaced holes 80 defined therein for cooperation with bolts 82 to affix the plate to frame portion 26 as previously described. The brace bar 84 includes an outer end 86 received within a socket 88 attached to the side of arm 72, similar to the socket 64, and the inner end of the bar rather than being provided with a plate, is threaded at 90, and includes a radial shoulder 92.

Installation of the embodiment of FIG. 3 will be appreciated from FIG. 5. The plate 78 is bolted to the underside of the frame portion 26, and the brace bar threaded end 90 is inserted through a hole, not shown, in the frame vertical portion 22 until the shoulder 92 engages the portion 22. Thereupon, a nut 94 is threaded upon the threaded end of the brace bar. The hole through which the threaded end 90 is inserted may be drilled by the installer, or may be one of the holes previously existing in the vehicle frame rail. A chain and turnbuckle assembly is interposed between the outer end of the arm 72 and the camper enclosure in a manner identical to that of the previously described embodiment.

Figure 8:
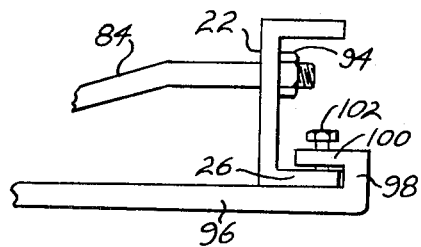
FIG. 8 is an enlarged detail view of another embodiment of the invention.

FIG. 8 illustrates an embodiment of the invention wherein the arm of the hold-down is attached to the lower frame by portion 26 by a set screw type connection, rather than a bolt extending through a bolt hole. In FIG. 8 the arm 96 includes a portion 98 and a horizontal portion 100 into which the set screw 102 is threaded for bearing upon the leg portion 26. Thus, by tightening set screw 102 the inner end of arm 96 may be firmly attached to the frame without the existence of bolt holes therein. The outer end of arm 96 is identical to that of arms 32 and 72 and brace bar 54 cooperates with the arm and frame portion 22 as in FIGS. 3 and 5.

It will be appreciated that the hold-down of the invention is of an economical construction, may be readily installed by the camper owner and user without requiring special skills and tools, and a direct interconnection between the camper enclosure and vehicle frame is produced which produces superior stability and riding characteristics. By "bypassing" the pickup truck bed completely the direct connection of the camper enclosure to the frame minimizes "tipping" and other adverse weight distribution effects existing with bed mounted hold-down devices. In that the hold-down may be bolted upon the vehicle frame, it may be readily removed in the event the pickup truck is to be used without the camper, or the truck is to be sold and the hold-downs are to be retained.

It is appreciated that various modifications to the inventive concept may be apparent to those skilled in the art without departing from the spirit and scope of the invention.

I claim:

1. A frame mounted hold-down for recreational vehicle campers comprising an enclosure supported upon a pickup truck bed wherein the pickup truck includes a frame member having an upper region including a vertical portion and a lower region including a lower horizontal portion comprising, in combination, an elongated arm having an inner end and an outer end, first frame member mounting means defined on said arm inner end for attachment to the frame member lower region, bracing means mounted on said arm having an inner end and an outer end, said bracing means outer end being attached to said arm at a location spaced from said arm inner end, second frame member mounting means defined on said bracing means inner end for attachment to the frame member upper region, said bracing means inner end being spared vertically above said arm inner end, to resist vertical bending forces imposed on said arm outer end and camper enclosure attachment means attached to said arm outer end.

2. In a frame mounted hold-down for recreational vehicle campers as in claim 1 wherein said first mounting means includes means for attaching said arm inner end to the frame member horizontal portion and said second mounting means includes means for attaching said bracing means inner end to the frame member vertical portion.

3. In a frame mounted hold-down for recreational vehicle campers as in claim 1 wherein said first mounting means includes holes adapted to receive fasteners and said second mounting means includes at least one fastener receivable within a hole defined in the frame member vertical portion.

4. In a frame mounted hold-down for recreational vehicle campers as in claim 1 wherein said first mounting means includes a horizontally disposed plate mounted on said arm inner end, and at least one fastener receiving hole defined in said plate for affixing said plate to the frame member horizontal portion.

5. In a frame mounted hold-down for recreational vehicle campers as in claim 4 wherein said second mounting means comprises a vertically disposed plate attached to said bracing means inner end, and at least one fastener receiving hole defined in said vertically disposed plate for affixing said plate to the frame member vertical portion.

6. In a frame mounted hold-down for recreational vehicle campers as in claim 4, threads defined upon said bracing means inner end, and a shoulder defined upon said bracing means inner end adjacent said threads adapted to engage the frame member vertical portion upon said thread being inserted through a hole in said frame member vertical portion.

7. In a frame mounted hold-down for recreational vehicle campers as in claim 1, a socket defined on said arm intermediate said inner and outer arm ends having an open end disposed toward said arm inner end, said bracing means outer end being received within said socket through said open end thereof.

8. In a frame mounted hold-down for recreational vehicle campers as in claim 2 wherein said first mounting means includes an arm portion extending around said frame member horizontal portion, and a set screw threadedly supported on said arm portion for engaging said horizontal portion and fixing said arm inner end thereto.

* * * * *